United States Patent
Kodama et al.

(10) Patent No.: US 7,031,591 B2
(45) Date of Patent: Apr. 18, 2006

(54) OPTICAL WAVEGUIDE, FORMING MATERIAL AND MAKING METHOD

(75) Inventors: Kinya Kodama, Usui-gun (JP);
Tsutomu Kashiwagi, Usui-gun (JP);
Toshio Shiobara, Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 145 days.

(21) Appl. No.: 10/620,471

(22) Filed: Jul. 17, 2003

(65) Prior Publication Data

US 2004/0017994 A1    Jan. 29, 2004

(30) Foreign Application Priority Data

Jul. 18, 2002   (JP) .............................. 2002-209388

(51) Int. Cl.
  *G02B 6/10* (2006.01)
  *G02B 6/00* (2006.01)
  *G03C 5/00* (2006.01)

(52) U.S. Cl. .................... 385/143; 385/145; 430/321

(58) Field of Classification Search ................ 522/31, 522/148, 170, 172; 528/40; 524/837; 385/123–128, 385/143, 145; 430/269, 280.1, 270.1, 321
See application file for complete search history.

(56) References Cited

U.S. PATENT DOCUMENTS

| | | | | |
|---|---|---|---|---|
| 5,357,024 A | * | 10/1994 | Leclaire | 528/39 |
| 5,457,003 A | * | 10/1995 | Tanaka et al. | 430/176 |
| 5,952,044 A | * | 9/1999 | Deichmann et al. | 427/230 |
| 6,207,728 B1 | * | 3/2001 | Sekiguchi et al. | 522/83 |
| 6,537,723 B1 | * | 3/2003 | Toyoda et al. | 430/270.1 |
| 6,832,036 B1 | * | 12/2004 | Ghoshal et al. | 385/143 |

FOREIGN PATENT DOCUMENTS

| | | | |
|---|---|---|---|
| EP | 0 466 025 A2 | * | 1/1992 |
| JP | 03287627 A | * | 4/1990 |
| JP | 3-288857 | | 12/1991 |
| JP | 4-070662 | | 3/1992 |
| JP | 4-338958 | | 11/1992 |

* cited by examiner

Primary Examiner—Susan Berman
(74) Attorney, Agent, or Firm—Oblon, Spivak, Maier & Neustadt, P.C.

(57) ABSTRACT

An optical waveguide-forming material is comprised of a photocurable organopolysiloxane composition comprising an alkali-soluble organopolysiloxane and a photoacid generator, wherein the organopolysiloxane is obtained by (co)hydrolytic condensation of a triorganoxysilane having hydrolyzable epoxide and has an average molecular weight of 500–50,000 as determined by GPC using polystyrene standards. The optical waveguide-forming material, when subjected to pattern formation by photolithography, can be resolved with an alkaline aqueous solution, has a high sensitivity and resolution, and offers a cured film having improved light transmittance, heat resistance and humidity resistance.

16 Claims, No Drawings

OPTICAL WAVEGUIDE, FORMING MATERIAL AND MAKING METHOD

This invention relates to a silicone base optical waveguide-forming material using organopolysiloxane, an optical waveguide using the same, and a photolithographic method for preparing an optical waveguide using the same. More particularly, it relates to an optical waveguide-forming material in the form of a photocurable organopolysiloxane composition which is photocurable with the aid of a photoacid generator, which in the uncured state is soluble in an alkaline aqueous solution and polar solvents such as alcohols, ketones and ethers, but in the cured state, substantially insoluble in these solvents, and which forms a film that can be patterned by photolithography and has improved sensitivity and resolution as well as high light transmittance, heat resistance and humidity resistance.

BACKGROUND OF THE INVENTION

Silicone resins which are a family of high molecular weight compounds are less expensive and easier to process than quartz glass. Like acrylic resins, epoxy resins and fluorinated polyimide resins, silicone resins are regarded useful as optical propagation media for optical waveguides or the like. By imparting photo-curability to these resins, pattern formation by photolithography becomes possible. Few materials which have high resolution in aqueous solution are available from silicone resins because of their characteristics. The use of alkali-soluble polysiloxane resins as resist material is described in JP-A 3-288857, JP-A 4-070662 and JP-A 4-338958 corresponding to U.S. Pat. No. 5,457,003, but none of them exhibit good patterning performance on alkali development as an optical waveguide-forming material.

SUMMARY OF THE INVENTION

An object of the invention is to provide an optical waveguide-forming material using a silicone resin which is practical, economical and easy to process, exhibits satisfactory performance in patterning by photolithography followed by alkali development, has a high sensitivity and resolution, and offers a cured film having light transmittance, heat resistance and humidity resistance. Another object is to provide an optical waveguide using the same material and a simple method of preparing an optical waveguide by photolithography using the same material.

It has been found that an improved optical waveguide-forming material is available from a photocurable organopolysiloxane composition comprising an alkali-soluble organopolysiloxane which is obtained by (co)hydrolytic condensation of an epoxy-modified triorganoxysilane compound having the general formula (1), shown below, or a mixture of silane compounds containing the same, thus possesses hydroxyl groups resulting from ring-opening of some or all of epoxides, and has an average molecular weight of 500 to 50,000 as determined by gel permeation chromatography (GPC) using polystyrene standards, and a photoacid generator. This material can be patterned through alkali development by photolithography, exhibits a high sensitivity and resolution, and forms a cured coating which has a light transmittance sufficient for use as an optical waveguide, easy control of refractive index, heat resistance and humidity resistance.

Therefore, the present invention provides an optical waveguide-forming material, an optical waveguide using the same, and a method for preparing an optical waveguide using the same.

In a first aspect, the invention provides an optical waveguide-forming material comprising a photocurable organopolysiloxane composition comprising an alkali-soluble organopolysiloxane and a photoacid generator. In one embodiment, the organopolysiloxane is obtained by (co)hydrolytic condensation of at least one silane compound having the general formula (1):

$$R^1Si(OR^2)_3 \tag{1}$$

wherein $R^1$ is a monovalent organo group of 2 to 30 carbon atoms having hydrolyzable epoxide, and $R^2$ is hydrogen or a substituted or unsubstituted monovalent hydrocarbon group of 1 to 10 carbon atoms.

In another embodiment, the organopolysiloxane is obtained by cohydrolytic condensation of at least one silane compound having the general formula (1) and at least one silane compound having the general formula (2):

$$R^3Si(OR^2)_3 \tag{2}$$

wherein $R^2$ is as defined above and $R^3$ is a monovalent hydrocarbon group of 1 to 20 carbon atoms, the silane compound of formula (1) being in a proportion of at least 10 mol % based on the entire silane compounds.

In a further embodiment, the organopolysiloxane is obtained by cohydrolytic condensation of at least one silane compound having the general formula (1), at least one silane compound having the general formula (2), and at least one silane compound having the general formula (3):

$$R^4_2Si(OR^2)_2 \tag{3}$$

wherein $R^2$ is as defined above and $R^4$ is a group as represented by $R^1$ or $R^3$, the silane compound of formula (1) being in a proportion of at least 10 mol % based on the entire silane compounds, the silane compound of formula (3) being in a proportion of up to 40 mol % based on the entire silane compounds.

In a still further embodiment, the organopolysiloxane has the average compositional formula (4):

$$R^1_a R^5_b R^3_c R^4_d (R^2O)_e SiO_{(4-a-b-c-d-e)/2} \tag{4}$$

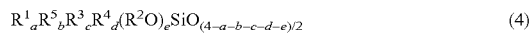

wherein $R^1$ is a monovalent organo group of 2 to 30 carbon atoms having hydrolyzable epoxide, $R^2$ is hydrogen or a substituted or unsubstituted monovalent hydrocarbon group of 1 to 10 carbon atoms, $R^3$ is a monovalent hydrocarbon group of 1 to 20 carbon atoms, $R^4$ is a group as represented by $R^1$ or $R^3$, $R^5$ is a monovalent organo group of 2 to 30 carbon atoms as represented by $R^1$ in which the epoxide ring has been opened, the subscripts a, b, c, d and e are positive numbers satisfying $0 \leq a \leq 0.9$, $0.1 \leq b \leq 1.0$, $0.1 \leq a+b \leq 1.0$, $0 \leq c \leq 0.9$, $0 \leq d < 0.8$ and $0 < e \leq 0.5$. In all the embodiments, the organopolysiloxane has an average molecular weight of 500 to 50,000 as determined by GPC using polystyrene standards.

Preferably, the photocurable organopolysiloxane composition further comprises a solvent. Also preferably, the photocurable organopolysiloxane composition further comprises at least one component selected from the group consisting of a reactive diluent, acid diffusion retarder, photosensitizer, dehydrating agent and microparticulate inorganic oxide.

A second aspect of the invention provides an optical waveguide formed using the optical waveguide-forming material defined above.

A third aspect of the invention provides a method for preparing an optical waveguide, comprising processing the above optical waveguide-forming material by photolithography.

DESCRIPTION OF THE PREFERRED EMBODIMENTS

The optical waveguide-forming material of the invention is comprised of a photocurable organopolysiloxane composition comprising an alkali-soluble organopolysiloxane and a photoacid generator, wherein the organopolysiloxane is obtained by (co)hydrolytic condensation of a triorganoxysilane having hydrolyzable epoxide or a mixture of silanes containing the same, thus possesses hydroxyl groups resulting from ring-opening of some or all of epoxides, and has an average molecular weight of 500 to 50,000 as determined by GPC using polystyrene standards.

Alkali-soluble Organopolysiloxane

The alkali-soluble organopolysiloxane used herein is an organopolysiloxane with a branched structure resulting from (co)hydrolytic condensation of at least one epoxy-modified triorganoxysilane having one or more hydrolyzable epoxides represented by the general formula (1) or a mixture of silane compounds containing the same. The preferred organopolysiloxane is a product of cohydrolytic condensation of at least one epoxy-modified triorganoxysilane represented by the general formula (1) and at least one organotriorganoxysilane represented by the general formula (2), or cohydrolytic condensation of at least one epoxy-modified triorganoxysilane represented by the general formula (1), at least one organotriorganoxysilane represented by the general formula (2) and at least one diorganodiorganoxysilane represented by the general formula (3).

$$R^1Si(OR^2)_3 \quad (1)$$

$$R^3Si(OR^2)_3 \quad (2)$$

$$R^4{}_2Si(OR^2)_2 \quad (3)$$

Herein $R^1$ is a monovalent organo group of 2 to 30 carbon atoms having hydrolyzable epoxide, $R^2$ is hydrogen or a substituted or unsubstituted monovalent hydrocarbon group of 1 to 10 carbon atoms, $R^3$ is a monovalent hydrocarbon group of 1 to 20 carbon atoms, and $R^4$ is a group as represented by $R^1$ or $R^3$.

The monovalent organo groups containing one or more epoxides represented by $R^1$ have 2 to 30 carbon atoms, preferably 3 to 20 carbon atoms, more preferably 6 to 12 carbon atoms. Illustrative non-limiting examples include glycidyl, glycidoxymethyl, 2-glycidoxyethyl, 3-glycidoxypropyl, 2-(3,4-epoxycyclohexyl)ethyl, 2-(2,3-epoxycyclohexyl)ethyl, 3-(N-glydicyl)aminopropyl, 3-(N,N-diglycidyl)aminopropyl, 3-(N-methyl-N-glycidyl)aminopropyl and 3-(N-allyl-N-glycidyl)aminopropyl. In a particular application, deuterated organo groups may be used.

The monovalent hydrocarbon groups represented by $R^2$ are preferably alkyl and alkenyl groups having 1 to 10 carbon atoms while alkoxy-substituted alkyl groups are also useful. Examples include methyl, ethyl, propyl, isopropyl, butyl, isobutyl, tert-butyl, pentyl, neopentyl, hexyl, heptyl, cyclohexyl, cycloheptyl, octyl, α-ethylhexyl, vinyl, allyl, propenyl, isopropenyl, and butenyl. Of these, methyl, ethyl and vinyl are preferred. In a particular application, deuterated groups may be used. $R^2$ can also be hydrogen or deuterium.

The monovalent hydrocarbon groups represented by $R^3$ are preferably alkyl and alkenyl groups having 1 to 10 carbon atoms and aryl and aralkyl groups having 6 to 20 carbon atoms. Examples of suitable alkyl and alkenyl groups having 1 to 10 carbon atoms include methyl, ethyl, propyl, isopropyl, butyl, isobutyl, tert-butyl, pentyl, neopentyl, hexyl, heptyl, cyclohexyl, cycloheptyl, octyl, α-ethylhexyl, vinyl, allyl, propenyl, isopropenyl, and butenyl, with methyl, ethyl and vinyl being preferred. Deuterated groups may be used. Examples of suitable aryl and aralkyl groups having 6 to 20 carbon atoms include phenyl, benzyl, tolyl, and styryl, with phenyl being preferred. Deuterated aromatic hydrocarbon groups may also be used.

Examples of the epoxy-modified triorganoxysilane having formula (1) include, but are not limited to, 3-glycidoxypropyltrimethoxysilane, 2-(3,4-epoxycyclohexylethyl)trimethoxysilane and 3-glycidoxypropyltriethoxysilane.

Examples of the organotriorganoxysilane having formula (2) include, but are not limited to, methyltrimethoxysilane, methyltriethoxysilane, methyltripropoxysilane, methyltributoxysilane, ethyltrimethoxysilane, ethyltriethoxysilane, ethyltripropoxysilane, ethyltributoxysilane, propyltrimethoxysilane, propyltriethoxysilane, propyltripropoxysilane, propyltributoxysilane, vinyltriethoxysilane, vinyltri(methoxyethoxy)silane, phenyltrimethoxysilane, phenyltriethoxysilane, phenyltripropoxysilane, benzyltrimethoxysilane, benzyltriethoxysilane, and p-styryltrimethoxysilane.

Examples of the diorganodiorganoxysilane having formula (3) include, but are not limited to, dimethyldimethoxysilane, dimethyldiethoxysilane, dimethyldipropoxysilane, dimethyldibutoxysilane, diethyldimethoxysilane, diethyldiethoxysilane, diethyldipropoxysilane, diethyldibutoxysilane, dipropyldimethoxysilane, dipropyldiethoxysilane, dipropyldipropoxysilane, dipropyldibutoxysilane, divinyldiethoxysilane, divinyldi(methoxyethoxy)silane, and diphenyldihydroxysilane.

In the practice of the invention, the silanes of formulae (1), (2) and (3) are mixed in such a proportion that the epoxy-modified triorganoxysilane having formula (1) may account for at least 10 mol % (10 to 100 mol %), preferably 20 to 80 mol % of the total amount of silanes, the organotriorganoxysilane having formula (2) may account for 0 to 90 mol %, preferably 20 to 80 mol % of the total amount of silanes, and the diorganodiorganoxysilane having formula (3) may account for 0 to 40 mol %, preferably 0 to 20 mol % of the total amount of silanes.

Any desired method may be employed in preparing the alkali-soluble organopolysiloxane. When silanes of formulae (1), (2) and (3) are used, for example, the epoxy-modified triorganoxysilane having formula (1) is first combined with the organotriorganoxysilane having formula (2) and the diorganodiorganoxysilane having formula (3), an acid catalyst is added to the mixture, if necessary, together with a solvent, and cohydrolysis and polycondensation is effected under acidic conditions, thereby yielding a cohydrolytic condensate having silanol groups.

According to the invention, (co)hydrolysis is effected in the presence of an acid catalyst. Any inorganic acids and organic acids known as acid catalysts may be used. Exemplary inorganic acids are hydrochloric acid, sulfuric acid and hydrofluoric acid, and exemplary organic acids are acetic acid and oxalic acid. Of these, hydrochloric acid, acetic acid and oxalic acid are preferred.

Usually acidic (co)hydrolysis is preferably carried out at 0 to 50° C. for 60 minutes or longer. The resulting (co)hydrolyzate is then subjected to polycondensation. The polycondensation conditions are important in controlling the molecular weight of organopolysiloxane. The rate of hydrolysis is so high that polycondensation reaction can more or less take place within the reaction time for hydrolysis. To produce an organopolysiloxane having a weight average molecular weight of say 1,000 or higher (as measured by GPC using polystyrene standards), reaction is continued to drive polycondensation reaction forward while the solvent and the alcohol formed are being distilled off by heating. Preferably polycondensation reaction is effected usually at a temperature above the boiling point of the solvent for 120 to 180 minutes.

In the (co)hydrolytic condensate product obtained through (co)hydrolysis and polycondensation as described above, organoxy groups (e.g., alkoxy) and silanol groups are left behind. The (co)hydrolytic condensate product can be improved in shelf stability by converting silanol groups therein to trialkylsiloxy groups.

Of the alkali-soluble organopolysiloxanes obtained from silanes of formula (1) and optionally formula (2) or (3) through (co)hydrolytic polycondensation by the above-described procedure, an organopolysiloxane having the average compositional formula (4) is preferred.

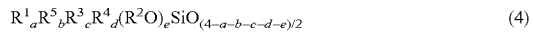

$$R^1_a R^5_b R^3_c R^4_d (R^2O)_e SiO_{(4-a-b-c-d-e)/2} \quad (4)$$

Herein $R^1$, $R^2$, $R^3$ and $R^4$ are as defined above, $R^5$ is a monovalent organo group of 2 to 30 carbon atoms resulting from ring opening of the epoxide on the organo group represented by $R^1$, the subscripts a, b, c, d and e are positive numbers satisfying $0 \leq a \leq 0.9$, $0.1 \leq b \leq 1.0$, $0.1 \leq a+b \leq 1.0$, $0 \leq c \leq 0.9$, $0 \leq d < 0.8$ and $0 < e \leq 0.5$.

$R^1$ in formula (1) is an organo group having hydrolyzable epoxide which undergoes ring cleavage or opening by the acid or alkali during the hydrolytic condensation reaction whereby $R^1$ converts to $R^5$ in average compositional formula (4). Ring opening entails formation of a hydroxyl group which functions to enhance the alkali solubility of the silicone resin, improving the patterning performance by photolithography.

$R^1$ to $R^4$ in formula (4) are as defined in formulae (1), (2) and (3), with their examples being also the same as above. $R^5$ is a monovalent organo group of 2 to 30 carbon atoms as represented by $R^1$ in which the epoxide ring has been opened, and specifically, an organo group having the structure —CH(OH)CH(B)— resulting from epoxide ring opening, wherein B is a base moiety of the acid (HB) used or OH or $OR^2$.

The preferred values of a, b, c, d and e are $0 \leq a \leq 0.4$, $0.2 \leq b \leq 0.8$, $0.2 \leq a+b \leq 0.8$, $0.2 \leq c \leq 0.8$, $0 \leq d \leq 0.4$ and $0.1 \leq e \leq 0.4$. The sum of a+b+c+d+e is preferably $1 < a+b+c+d+e \leq 1.7$, and especially $1.2 \leq a+b+c+d+e \leq 1.5$.

The alkali-soluble organopolysiloxane should have an average molecular weight, typically a weight average molecular weight of 500 to 50,000, preferably 1,000 to 20,000, as determined by GPC using polystyrene standards. Too low an average molecular weight fails to form a coating having heat resistance and humidity resistance whereas too high an average molecular weight detracts from alkali solubility.

Photoacid Generator

In the photocurable organopolysiloxane composition of the invention, any photoacid generator may be used as long as it is commonly used as a cationic photoacid generator. The acid generated therefrom is used in condensation of silanol remaining in the organopolysiloxane or the like. In general, onium salts and sulfonium salts are useful, for example, aromatic sulfonium salts of phosphorus hexafluoride and aromatic sulfonium salts of antimony hexafluoride.

The amount of the photoacid generator used is preferably 0.1 to 20 parts by weight, more preferably 0.5 to 10 parts by weight per 100 parts by weight of the alkali-soluble organopolysiloxane. With less than 0.1 part of the photoacid generator, the composition may become less photocurable, failing to form a fully cured film. More than 20 parts of the photoacid generator may achieve no additional effect and become uneconomical.

Solvent

A solvent may be added to the photocurable organopolysiloxane composition of the invention. Any solvent is useful as long as it is compatible with the alkali-soluble organopolysiloxane. Examples include ethers such as tetrahydrofuran, ketones such as methyl ethyl ketone and methyl isobutyl ketone, and alcohols such as methanol, ethanol, propanol, butanol, 2-propanol, 1-methoxy-2-propanol, 2-ethoxyethanol, 2-ethylhexyl alcohol, 1,4-butane diol, ethylene glycol and propylene glycol. An appropriate amount of the solvent used is up to 10 parts by weight (0 to 10 parts by weight), especially 0.5 to 5 parts by weight per part by weight of the alkali-soluble organopolysiloxane.

Other Components

Other components may be uniformly mixed in the photocurable organopolysiloxane composition of the invention to form an optical waveguide-forming material, as long as this does not compromise the desired optical waveguide characteristics. Suitable other components include antioxidants such as BHT and vitamin B, and reactive diluents such as vinyl ethers, vinyl amides, epoxy resins, oxetanes, allyl phthalates, and vinyl adipate, which are desirably used in amounts of up to 0.2 part by weight per part by weight of the alkali-soluble organopolysiloxane. Also amines such as triethylamine are useful as the acid diffusion retarder, which are desirably used in amounts of up to 0.1 part by weight per part by weight of the alkali-soluble organopolysiloxane. For enhancing the sensitivity of photoacid generator, photosensitizers such as coumarin, bisazido, benzoin, and benzophenone compounds may be used in amounts of up to 0.1 part by weight per part by weight of the alkali-soluble organopolysiloxane. Organic dehydrating agents such as acid anhydrides may be used in amounts of up to 0.2 part by weight per part by weight of the alkali-soluble organopolysiloxane. Inorganic oxides in microparticulate form (<1 μm) such as silica, alumina, titania and zirconia may be used in amounts of up to 1 part by weight per part by weight of the alkali-soluble organopolysiloxane.

Optical Waveguide-forming Material

The photocurable organopolysiloxane composition of the invention can be obtained by adding a photoacid generator and a solvent to an alkali-soluble organopolysiloxane, as described above, and optionally, adding other necessary components such as reactive diluent and acid diffusion retarder thereto, and uniformly mixing the combined material. The resulting photocurable organopolysiloxane composition is ready for use as an optical waveguide-forming material.

Optical Waveguide

The optical waveguide-forming material, in the uncured state, is soluble in alkaline aqueous solutions and polar solvents such as alcohols, ketones and ethers, but in the cured state, substantially insoluble in these solutions and solvents. This enables to form an optical waveguide by photolithography. In one typical procedure, the optical waveguide-forming material is applied to a predetermined substrate by means of a suitable applicator such as a spinner. If the composition contains a solvent, the solvent is removed by heating or air drying. There is formed a composition coating having a dry thickness of up to 100 μm, more preferably 5 to 50 μm. Light is irradiated to the coating directly using a mask aligner or after a photomask is placed over the surface of the coating. The light to be irradiated is selected, for example, from among ultraviolet rays including deep UV (typical wavelength 193 nm, 253 nm), i-line (wavelength 365 nm), g-line (wavelength 436 nm), and h-line (wavelength 405 nm). After exposure, heat treatment is carried out, preferably at 50 to 100° C. for several minutes to several ten minutes, to cure the exposed areas of the composition coating.

The uncured areas of the composition coating which have been covered with the photomask can be dissolved away using an alkaline aqueous solution, typically an aqueous solution of tetraalkylammonium hydroxide alone or in admixture. This results in a pattern corresponding to the photomask, that is, an optical waveguide pattern. Similar resolution is possible with a polar organic solvent such as methanol or THF. After the curing step, the coating is heated preferably at about 100° C. for 1 to 2 hours whereby the solvent and volatiles remaining in the cured optical waveguide coating can be completely volatilized off, yielding a coating having improved heat resistance, humidity resistance and adhesion.

When patterned by photolithography, the optical waveguide-forming material of the invention can form a pattern with a high resolution even at a coating thickness of 5 μm or more.

EXAMPLE

Examples and comparative examples are given below for illustrating the invention, but are not to be construed as limiting the invention thereto. The average molecular weight is as determined by gel permeation chromatography (GPC) using polystyrene standards. Mw denotes a weight average molecular weight. Et is ethyl.

Example 1

As an optical waveguide clad-forming material, 0.15 mol of 2-(3,4-epoxycyclohexylethyl)trimethoxysilane (1) and 0.15 mol of phenyltrimethoxysilane (2) were added to methanol solvent. Separately, as a core-forming material, 0.06 mol of 2-(3,4-epoxycyclohexylethyl)trimethoxysilane (1) and 0.24 mol of phenyltrimethoxysilane (2) were added to methanol solvent. To the respective solutions, with stirring, a mixture of deionized water and conc. hydrochloric acid as an acid catalyst was added dropwise to effect hydrolytic reaction at 25° C. Next, each reaction mixture was heated under reflux in an oil bath at 100° C. for at least one hour to effect polycondensation reaction. Polycondensation reaction was continued for a further 2 hours in the oil bath at 100° C. while the solvent and alcohol by-products formed were being distilled off. The thus obtained hydrolytic condensate was washed with water and dissolved in tetrahydrofuran. The solution was passed through a filter with a pore diameter of 0.8 μm. From the filtrate, the solvent was distilled off in vacuum at 80° C./2 mmHg. The residue was vacuum dried at room temperature for 24 hours, yielding an alkali-soluble organopolysiloxane of the following average compositional formula in powdery solid form.

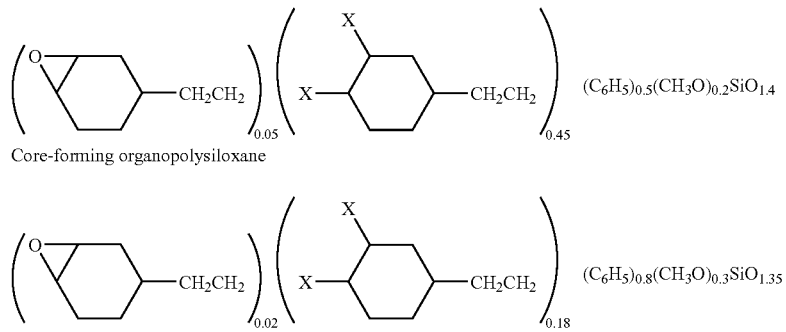

Note that two X's are —OH and —Cl, —OH and —OH, or —OH and —OCH₃.

On GPC analysis, the clad-forming polysiloxane (A) had Mw of 2800 and the core-forming polysiloxane (B) had Mw of 2700.

To 10 parts by weight of the alkali-soluble organopolysiloxanes was added 0.5 part by weight of a photoacid generator (MDS-105 by Midori Chemical) in 4 parts by weight of diglyme. Uniform mixing gave optical waveguide-forming materials (A) and (B) within the scope of the invention. After photocuring, the materials (A) and (B) had a refractive index at 850 nm of 1.5264 and 1.5422, respectively.

The optical waveguide-forming material (A) was applied onto a silicon wafer by a spin coating technique while controlling the rotational speed so as to achieve a coating thickness of 25 μm. The coating was dried in a dryer at 80° C. for 10 minutes. The composition coating in the uncured state was non-tacky. The composition coating was exposed to light (100 mJ/cm²) and heated in a dryer at 80° C. for 15 minutes to form a lower clad layer of an optical waveguide. Next, the optical waveguide-forming material (B) was applied onto the lower clad layer by a spin coating technique while controlling the rotational speed so as to achieve a coating thickness of 10 μm. The coating was dried in a dryer at 80° C. for 10 minutes. The composition coating (B) in the uncured state was non-tacky. The composition coating was exposed to light (100 mJ/cm$^2$) by means of a mask aligner, and heated in a dryer at 80° C. for 10 minutes for curing the exposed areas. By dipping in an aqueous solution of Et$_4$NOH, the resin in the unexposed areas was dissolved away. Subsequent washing with deionized water left a resolved pattern (core layer) of 10 μm L/S on the lower clad layer. The optical waveguide-forming material (A) was applied onto the core layer by a spin coating technique while controlling the rotational speed so as to achieve a coating thickness of 10 μm as measured from the upper surface of the core layer. The coating was dried in a dryer at 80° C. for 10 minutes. The composition coating was similarly exposed to light (100 mJ/cm$^2$) and heated in a dryer at 80° C. for 10 minutes to form an upper clad layer, completing an optical waveguide of the embedment type.

The optical waveguide thus obtained was measured to have a transmission loss of less than 0.05 dB/cm at 850 nm. After 100 cycles of a thermal cycling test (−20° C./120° C.), the transmission loss remained unchanged and neither peeling from the substrate nor crack generation was observed. After 1000 hours of holding at 85° C./85% RH, the transmission loss remained unchanged.

Example 2

The procedure of Example 1 was repeated except that 0.24 mol of 2-(3,4-epoxycyclohexylethyl)trimethoxysilane (1) and 0.06 mol of phenyltrimethoxysilane (2) were used as the optical waveguide clad-forming material, and 0.15 mol of 2-(3,4-epoxycyclohexylethyl)trimethoxysilane (1) and 0.15 mol of phenyltrimethoxysilane (2) were used as the core-forming material. There were obtained alkali-soluble organopolysiloxanes of the following average compositional formulae.

Note that two X's are —OH and —Cl, —OH and —OH, or —OH and —OCH$_3$.

On GPC analysis, the clad-forming polysiloxane (C) had Mw of 3200 and the core-forming polysiloxane (D) had Mw of 2800.

Using the polysiloxanes, optical waveguide-forming materials (C) and (D) were prepared as in Example 1. After photocuring, the materials (C) and (D) had a refractive index at 850 nm of 1.5106 and 1.5264, respectively.

Using the polysiloxanes (C) and (D), an optical waveguide of the embedment type was fabricated as in Example 1. The optical waveguide was measured to have a transmission loss of less than 0.05 dB/cm at 850 nm. After 100 cycles of a thermal cycling test (−20° C./120° C.), the transmission loss remained unchanged and neither peeling from the substrate nor crack generation was observed. After 1000 hours of holding at 85° C./85% RH, the transmission loss remained unchanged.

Example 3

The procedure of Example 1 was repeated except that 0.30 mol of 2-(3,4-epoxycyclohexylethyl)trimethoxysilane (1) was used as the optical waveguide clad-forming material, and 0.18 mol of 2-(3,4-epoxycyclohexylethyl)trimethoxysilane (1) and 0.12 mol of phenyltrimethoxysilane (2) were used as the core-forming material. There were obtained alkali-soluble organopolysiloxanes of the following average compositional formulae.

Clad-forming organopolysiloxane

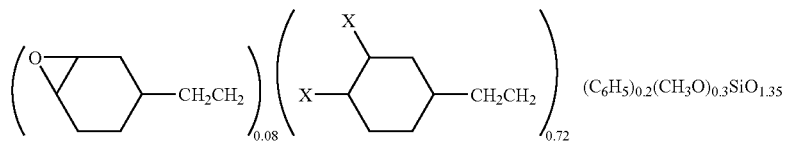

Core-forming organopolysiloxane

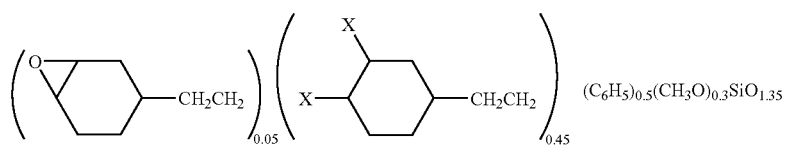

Clad-forming organopolysiloxane

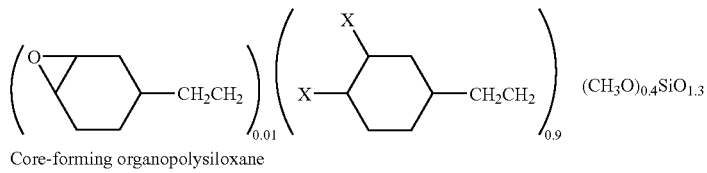

Core-forming organopolysiloxane

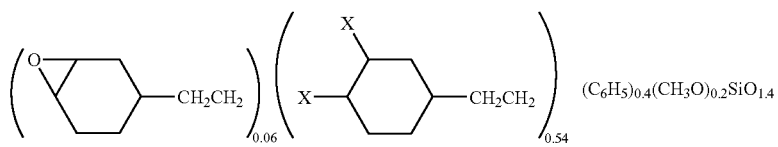

Note that two X's are —OH and —Cl, —OH and —OH, or —OH and —OCH$_3$.

On GPC analysis, the clad-forming polysiloxane (E) had Mw of 2500 and the core-forming polysiloxane (F) had Mw of 2700.

Using the polysiloxanes, optical waveguide-forming materials (E) and (F) were prepared as in Example 1. After photocuring, the materials (E) and (F) had a refractive index at 850 nm of 1.5000 and 1.5180, respectively.

Using the polysiloxanes (E) and (F), an optical waveguide of the embedment type was fabricated as in Example 1. The optical waveguide was measured to have a transmission loss of less than 0.05 dB/cm at 850 nm. After 100 cycles of a thermal cycling test (−20° C./120° C.), the transmission loss remained unchanged and neither peeling from the substrate nor crack generation was observed. After 1000 hours of holding at 85° C./85% RH, the transmission loss remained unchanged.

Example 4

By following the procedure of Example 1 using the composition containing 0.15 mol of 2-(3,4-epoxycyclohexylethyl)trimethoxysilane (1) and 0.15 mol of phenyltrimethoxysilane (2) as the clad-forming material and changing the reaction time, organopolysiloxanes having different average molecular weights were synthesized (Runs 1 to 4). These polysiloxanes were examined for alkali solubility by forming a coating (20–25 µm) of each organopolysiloxane on a silicon wafer, dipping the coating in an aqueous solution of Et$_4$NOH, and measuring the time passed until the coating was completely dissolved away. The results are shown in Table 1.

TABLE 1

| Resin Synthesis Example | Example 1 | Run 1 | Run 2 | Run 3 | Run 4 |
|---|---|---|---|---|---|
| Mw by GPC | 2800 | 800 | 1500 | 7800 | 12500 |
| Alkali dissolution time (sec) | 10 | <5 | <5 | 25 | 90 |

Using these polysiloxanes, a transmission loss was measured as in Example 1. The results are shown in Table 2. No difference of transmission loss is caused by varying molecular weight.

TABLE 2

| Resin Synthesis Example | Example 1 | Run 1 | Run 2 | Run 3 | Run 4 |
|---|---|---|---|---|---|
| Transmission loss @850 nm | <0.05 dB/cm | <0.05 dB/cm | <0.05 dB/cm | <0.05 dB/cni | <0.05 dB/cm |

Comparative Example 1

As an optical waveguide clad-forming material, 0.15 mol of acryloyloxypropyltrimethoxysilane and 0.15 mol of phenyltrimethoxysilane were used. Separately, as a core-forming material, 0.06 mol of acryloyloxypropyltrimethoxysilane and 0.24 mol of phenyltrimethoxysilane were used. To the respective mixtures, with stirring, a mixture of deionized water and hydrochloric acid as an acid catalyst was added dropwise to effect hydrolytic reaction at 25° C. Next, each reaction mixture was heated under reflux in an oil bath at 100° C. for at least one hour to effect polycondensation reaction. Polycondensation reaction was continued for a further 2 hours in the oil bath at 100° C. while the solvent and alcohol by-products formed were being distilled off. The thus obtained hydrolytic condensate was dissolved in toluene and washed with water. The toluene layer was passed through a filter with a pore diameter of 0.8 µm. From the filtrate, the solvent was distilled off in vacuum at 80° C./2 mmHg, yielding an acrylic-modified organopolysiloxane in colorless clear solid form.

On GPC analysis, the clad-forming polysiloxane (a) had Mw of 8500 and the core-forming polysiloxane (b) had Mw of 8800.

To 10 parts by weight of the acrylic-modified organopolysiloxanes was added 0.3 part by weight of a photoinitiator (Darocure 1173C) in 5 parts by weight of ditoluene. Uniform mixing gave optical waveguide-forming materials (a) and (b). After photocuring, the materials (a) and (b) had a refractive index at 850 nm of 1.5062 and 1.5333, respectively.

The clad-forming material (a) was applied onto a silicon wafer by a spin coating technique while controlling the rotational speed so as to achieve a coating thickness of 25 µm. The coating was dried in a dryer at 80° C. for 5 minutes. The composition coating in the uncured state was non-tacky. The composition coating was exposed to light (200 mJ/cm$^2$) and heated in a dryer at 80° C. for 15 minutes to form a lower clad layer of an optical waveguide. Next, the core-forming material (b) was applied onto the lower clad layer by a spin coating technique while controlling the rotational speed so as to achieve a coating thickness of 10 μm. The coating was dried in a dryer at 80° C. for 5 minutes. The composition coating (b) in the uncured state was non-tacky. The composition coating was exposed to light (200 mJ/cm²) by means of a mask aligner. By dipping in toluene, the resin in the unexposed areas was dissolved away. Subsequent washing with pentane left a resolved pattern (core layer) of 10 μm L/S on the lower clad layer. It is noted that this composition coating could not be resolved with an alkaline aqueous solution. Next, the clad-forming material (a) was applied onto the core layer by a spin coating technique while controlling the rotational speed so as to achieve a coating thickness of 10 μm as measured from the upper surface of the core layer. The coating was dried in a dryer at 80° C. for 10 minutes. The composition coating was similarly exposed to light (200 mJ/cm²) and heated in a dryer at 80° C. for 15 minutes to form an upper clad layer, completing an optical waveguide of the embedment type.

The optical waveguide thus obtained was measured to have a transmission loss of less than 0.05 dB/cm at 850 nm.

The optical waveguide-forming material using a photocurable organopolysiloxane composition, when subjected to pattern formation by photolithography, can be resolved with an alkaline aqueous solution rather than organic solvents, has a high sensitivity and resolution, and offers a cured film having improved light transmittance, especially in the near infrared region, heat resistance and humidity resistance, and a refractive index which is readily controllable. Since the coating has a high light transmittance, the optical waveguide-forming material is very useful in forming an optical waveguide as an optical propagation path.

Japanese Patent Application No. 2002-209388 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An optical waveguide formed from an optical waveguide-forming material, said optical waveguide-forming material comprising a photocurable organopolysiloxane composition comprising an alkali-soluble organopolysiloxane and a photoacid generator,
   said organopolysiloxane possessing hydroxyl groups resulting from ring-opening of some or all of epoxides, and being obtained by (co)hydrolytic condensation of at least one silane compound having the formula (1):

$$R^1Si(OR^2)_3 \qquad (1)$$

wherein $R^1$ is a monovalent organo group of 2 to 30 carbon atoms having hydrolyzable epoxide, and $R^2$ is hydrogen or a substituted or unsubstituted monovalent hydrocarbon group of 1 to 10 carbon atoms, and having an average molecular weight of 500 to 50,000 as determined by GPC using polystyrene standards,
   wherein said (co)hydrolytic condensation comprises carrying out (co)hydrolysis in the presence of an acid catalyst, thereby forming a (co)hydrolyzate, and then subjecting the (co)hydrolyzate to polycondensation, while alcohol formed and any solvent present is distilled off by heating, thereby yielding a (co)hydrolytic condensate having silanol groups.

2. The optical waveguide of claim 1, wherein said organopolysiloxane is obtained by cohydrolytic condensation of said at least one silane compound having the formula (1) and additionally at least one silane compound having the formula (2):

$$R^3Si(OR^2)_3 \qquad (2)$$

wherein $R^2$ is as defined in formula (1) and $R^3$ is a monovalent hydrocarbon group of 1 to 20 carbon atoms, the silane compound of formula (1) being in a proportion of at least 10 mol % based on the entire silane compounds.

3. The optical waveguide of claim 2, wherein $R^2$ is a substituted or unsubstituted alkyl or alkenyl group.

4. The optical waveguide of claim 2, wherein said organopolysiloxane has the average compositional formula (4):

$$R^1{}_aR^5{}_bR^3{}_cR^4{}_d(R^2O)_eSiO_{(4-a-b-c-d-e)/2} \qquad (4)$$

wherein $R^5$ is a monovalent organo group of 2 to 30 carbon atoms as represented by $R^1$ in which the epoxide ring has been opened, the subscripts a, b, c, d and e are positive numbers satisfying $0 \leq a \leq 0.9$, $0.1 \leq b \leq 1.0$, $0.1 \leq a+b \leq 1.0$, $0 \leq c \leq 0.9$, $0 < d \leq 0.8$ and $0 < e \leq 0.5$.

5. The optical waveguide of claim 1, wherein said organopolysiloxane is obtained by cohydrolytic condensation of said at least one silane compound having the formula (1) and additionally at least one silane compound having the formula (2):

$$R^3Si(OR^2)_3 \qquad (2)$$

wherein $R^2$ is as defined in formula (1) and $R^3$ is a monovalent hydrocarbon group of 1 to 20 carbon atoms, and at least one silane compound having the formula (3):

$$R^4{}_2Si(OR^2)_2 \qquad (3)$$

wherein $R^2$ is as defined in formula (1) and $R^4$ is a group as represented by $R^1$ or $R^3$, the silane compound of formula (1) being in a proportion of at least 10 mol % based on the entire silane compounds, the silane compound of formula (3) being in a proportion of up to 40 mol % based on the entire silane compounds.

6. The optical waveguide of claim 5, wherein said organopolysiloxane has the average compositional formula (4):

$$R^1{}_aR^5{}_bR^3{}_cR^4{}_d(R^2O)_eSiO_{(4-a-b-c-d-e)/2} \qquad (4)$$

wherein $R^5$ is a monovalent organo group of 2 to 30 carbon atoms as represented by $R^1$ in which the epoxide ring has been opened, the subscripts a, b, c, d and e are positive numbers satisfying $0 \leq a \leq 0.9$, $0.1 \leq b \leq 1.0$, $01 \leq a+b \leq 1.0$, $0 \leq c \leq 0.9$ $0 \leq d < 0.8$ and $0 < e \leq 5$.

7. The optical waveguide of claim 6, wherein $R^2$ is a substituted or unsubstituted alkyl or alkenyl group.

8. The optical waveguide of claim 5, wherein $R^2$ is a substituted or unsubstituted alkyl or alkenyl group.

9. The optical waveguide of claim 1, wherein $R^2$ is a substituted or unsubstituted alkyl or alkenyl group.

10. The optical waveguide of claim 1, wherein said photocurable organopolysiloxane composition further comprises a solvent.

11. The optical waveguide of claim 1, wherein said photocurable organopolysiloxane composition further comprises at least one component selected from the group consisting of a reactive diluent, acid diffusion retarder, photosensitizer, dehydrating agent and microparticulate inorganic oxide.

12. The optical waveguide of claim 1, wherein said organopolysiloxane has the average compositional formula (4):

$$R^1_a R^5_b R^3_c R^4_d (R^2O)_e SiO_{(4-a-b-c-d-e)/2} \quad (4)$$

wherein $R^5$ is a monovalent organo group of 2 to 30 carbon atoms as represented by $R^1$ in which the epoxide ring has been opened, the subscripts a, b, c, d and e are positive numbers satisfying $0 \leq a \leq 0.9$, $0.1 \leq b \leq 1.0$, $0.1 \leq a+b \leq 1.0$, $0 \leq c \leq 0.9$, $0 \leq d < 0.8$ and $0 < e \leq 0.5$.

13. In a method for preparing an optical waveguide from an optical waveguide-forming material by photolithography, the improvement comprising using the optical waveguide-forming material of claim 1.

14. In a method for preparing an optical waveguide from an optical waveguide-forming material by photolithography, the improvement comprising using the optical waveguide-forming material of claim 2.

15. In a method for preparing an optical waveguide from an optical waveguide-forming material by photolithography, the improvement comprising using the optical waveguide-forming material of claim 5.

16. In a method for preparing an optical waveguide from an optical waveguide-forming material by photolithography, the improvement comprising using the optical waveguide-forming material of claim 6.

* * * * *